(12) United States Patent
Kim et al.

(10) Patent No.: US 7,093,870 B2
(45) Date of Patent: Aug. 22, 2006

(54) TRANSFORMABLE VEHICLE

(75) Inventors: Roger Kim, Southfield, MI (US); David Michael Lechkun, Shelby Township, MI (US); Anthony Prozzi, Detroit, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 11/160,338

(22) Filed: Jun. 20, 2005

(65) Prior Publication Data

US 2005/0230988 A1 Oct. 20, 2005

Related U.S. Application Data

(63) Continuation of application No. 10/605,043, filed on Sep. 3, 2003, now Pat. No. 6,929,301.

(60) Provisional application No. 60/437,919, filed on Jan. 4, 2003.

(51) Int. Cl.
*B60P 3/34* (2006.01)
(52) U.S. Cl. .............................. 296/24.33; 296/24.43; 296/26.08
(58) Field of Classification Search ............. 296/24.33, 296/24.43, 26.08, 26.09, 147
See application file for complete search history.

(56) References Cited

U.S. PATENT DOCUMENTS

| | | | |
|---|---|---|---|
| 3,419,304 A | 12/1968 | Sangimino | |
| 4,659,136 A | 4/1987 | Martin et al. | |
| 6,406,085 B1 | 6/2002 | Stanesic | |
| 6,416,104 B1 | 7/2002 | Fisher et al. | |
| 6,431,634 B1 | 8/2002 | Ananian | |
| 6,454,342 B1 | 9/2002 | Heselhaus et al. | |
| 6,474,714 B1 | 11/2002 | Stettner | |
| 6,485,085 B1 | 11/2002 | Pecho et al. | |
| 6,517,135 B1 | 2/2003 | de Gaillard | |
| 6,890,014 B1 * | 5/2005 | King et al. | 296/26.09 |
| 2002/0079718 A1 | 6/2002 | Neubrand | |
| 2002/0089204 A1 | 7/2002 | Fisher et al. | |
| 2003/0164622 A1 | 9/2003 | De Gaillard | |
| 2004/0245794 A1 * | 12/2004 | McManus et al. | 296/26.08 |

OTHER PUBLICATIONS

General Motors Advertisement, 1 page, accessed from http://www.gmc.som Dec. 31, 2002.

* cited by examiner

*Primary Examiner*—Jason Morrow
(74) *Attorney, Agent, or Firm*—David B. Kelley; Brooks & Kushman (57) ABSTRACT

A vehicle includes a transformable vehicle body having a first body configuration and a second body configuration. The first body configuration resembles a wagon-style vehicle that includes a fully enclosed passenger space and cargo area. The second body configuration resembles a pickup truck that includes a contracted enclosed passenger space and an open cargo area behind the contracted enclosed passenger space.

6 Claims, 8 Drawing Sheets

TRANSFORMABLE VEHICLE

CROSS-REFERENCE TO RELATED APPLICATIONS

This application is a continuation of U.S. application Ser. No. 10/605,043 filed Sep. 3, 2003, now U.S. Pat. No. 6,929,301, which is hereby incorporated herein by reference, and which in turn, claims the benefit of U.S. provisional application Ser. No. 60/437,919 filed Jan. 4, 2003.

BACKGROUND OF THE INVENTION

1. Field of the Invention

The present invention relates to a transformable vehicle that can be transformed to provide a number of different body configurations.

2. Background Art

Historically, vehicles have been designed to accommodate specific types of uses. For example, a work vehicle might be designed as a truck with a large flatbed, easily accessible from outside the vehicle, and configured to accommodate large or heavy payloads. Similarly, a family vehicle might be designed as a minivan, large enough to carry more than 5 passengers, yet still able to accommodate a reasonable amount of cargo. Another type of vehicle, the sedan, might be designed with elegant styling, and configured to provide quiet and comfort to the vehicle occupants.

Recently, a new breed of vehicle, the sport utility vehicle (SUV), has emerged, in part, to provide greater driving freedom. For example, some SUV's have off-road capability and a large cargo area that may make them useful as work vehicles. Similarly, the passenger compartment of many SUV's is large enough to comfortably accommodate five or more passengers. In addition, some SUV's today are elegantly designed, and are configured to provide the quiet and comfort previously only found in high-end sedans.

Despite their attempt to meet the disparate needs of many different uses, an SUV may not provide some users with sufficient flexibility. For example, although an SUV may include a large cargo area, it may not be as easily accessible as the cargo area of a flatbed truck. Hence, there still exists a need for a vehicle that can carry the passengers and cargo of a family vehicle, provide the large, easily accessible cargo area of an open flatbed truck, and yet still provide the styling of an elegant sedan.

SUMMARY OF THE INVENTION

Therefore, the present invention provides a flexible passenger vehicle body capable of being transformed into at least two different classes of vehicle styles. The vehicle body comprises a body shell having front and rear openings and at least one pair of transversely opposed door openings. A front panel is provided for closing the body shell front opening, and a pair of door panels is provided for closing the body shell door openings. A roof panel includes a fixed portion and movable portion. The movable portion has attached thereto a pair of transversely opposed rear pillars extending generally downward therefrom to engage the body shell. A back panel is coupled to the roof panel movable portion and extends between the rear pillars. A pair of opposing retractable rear side panels is affixed to the body shell behind the door panels. A tailgate is affixed to the body shell, and the tailgate, the retractable rear side panels, the roof panel movable portion and the back panel collectively enclose the body shell rear opening when the vehicle is in a first body configuration. The front panel, doors, roof panel, back panel, tailgate and retractable rear side panels define a fully enclosed passenger space and cargo area within the body shell in the first body configuration when the roof panel movable portion is in a first position. The front panel, doors, roof panel and back panel define a contracted enclosed passenger space in a second body configuration when the roof panel movable portion is in a second position. This creates an open cargo area behind the contracted enclosed passenger space.

The invention further provides a vehicle having a transformable vehicle body that includes first and second opposing door panels. The vehicle body also includes a roof panel, including a fixed portion and a movable portion, a back panel attached to the roof panel movable portion, and first and second retractable rear side panels disposed rearward the door panels. The transformable vehicle body has at least a first body configuration and a second body configuration. The first body configuration includes the retractable rear side panels and the roof panel movable portion each in an extended position. The first body configuration at least partially defines a first passenger compartment. The second body configuration includes the retractable rear side panels and the roof panel movable portion each in a retracted position. The second body configuration at least partially defines a second passenger compartment and an open cargo area. The second passenger compartment is smaller than the first passenger compartment, and is at least partially separated from the open cargo area by the back panel.

The invention also provides a method of transforming a vehicle body from a first body configuration to at least one other body configuration. The first body configuration includes a fully enclosed passenger space and cargo area, and a second body configuration includes a contracted enclosed passenger space and an open cargo area. The method comprises retracting first and second rear side portions, and moving a seat from a first position for seating a vehicle occupant to a second position, thereby forming a portion of a load floor. A side trim panel is moved from a first position to a second position, thereby facilitating movement of another trim panel over the side trim panel. A garnish panel is moved from a first position to a second position, thereby facilitating forward movement of a roof panel portion and a rear pillar attached to the roof panel portion. The roof panel portion and pillar are then moved forward. A shelf panel is moved adjacent a back panel, thereby substantially separating the contracted enclosed passenger space from the open cargo area. The garnish panel is moved from the second position to a third position, thereby placing the vehicle body in the second body configuration.

The above object and other objects, features, and advantages of the present invention are readily apparent from the following detailed description of the best modes for carrying out the invention when taken in connection with the accompanying drawings.

DETAILED DESCRIPTION OF THE PREFERRED EMBODIMENT(S)

Figure 1:
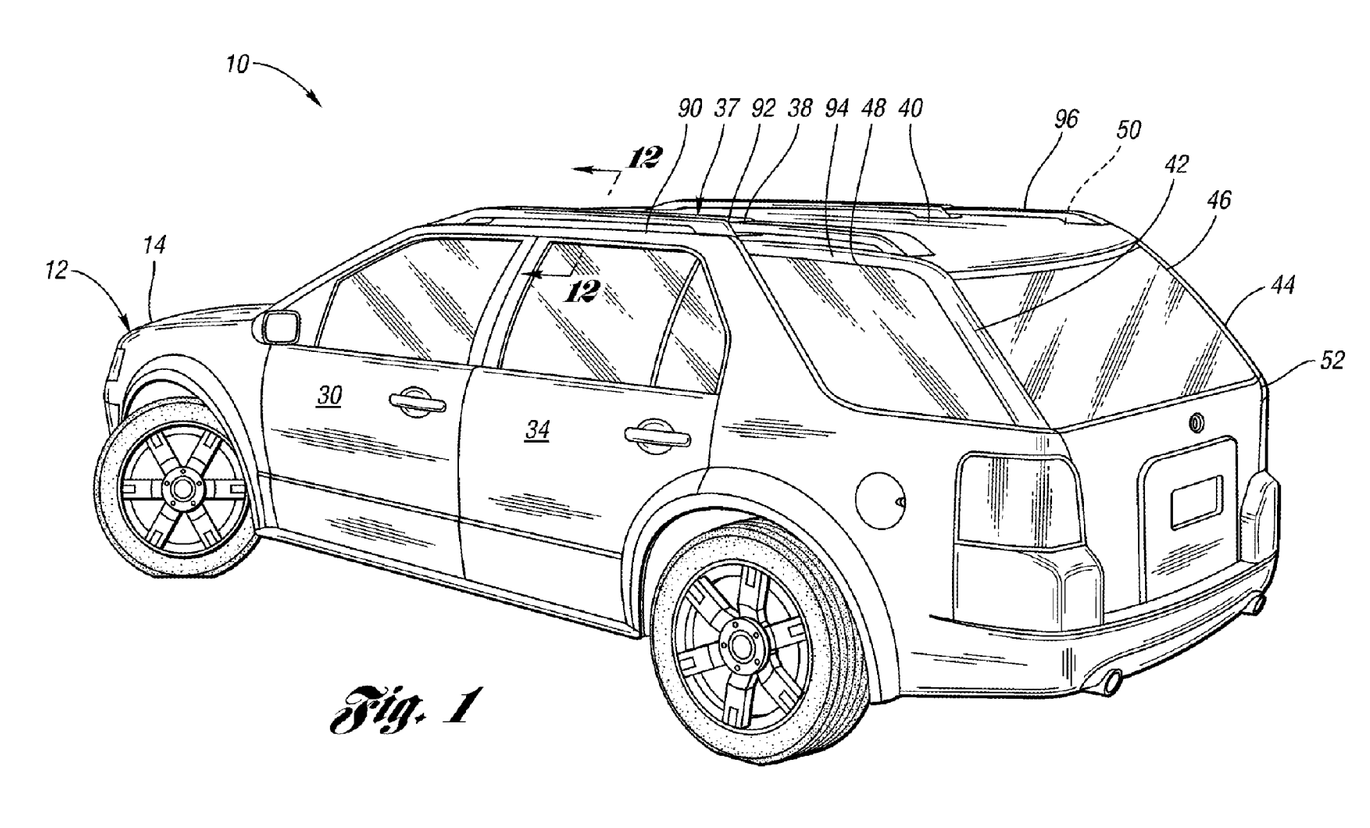
FIG. 1 is a perspective view of a vehicle in accordance with the present invention.
Figure 2:
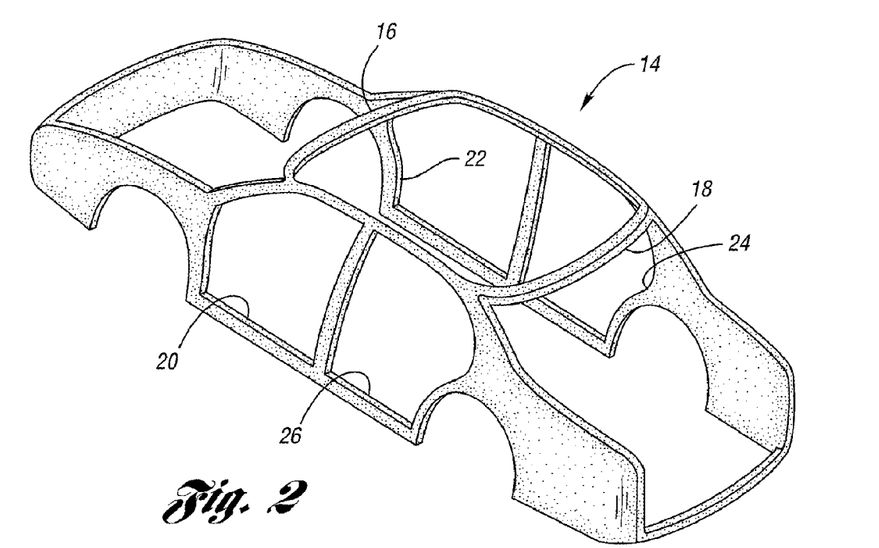
FIG. 2 is a perspective view of a body shell forming a portion of the vehicle shown in FIG. 1.

FIG. 1 shows a vehicle 10 having a flexible passenger vehicle body 12 in accordance with the present invention. The vehicle body 12 includes a body shell 14, shown in an isolated view in FIG. 2. The body shell 14 has front and rear openings 16, 18, and two pairs of transversely opposed door openings 20, 22, 24, 26. As seen in FIG. 2, door openings 20, 22 are a first pair of transversely opposed door openings, while the door openings 24, 26 are a second pair of transversely opposed door openings. The body shell 14, shown in FIG. 2, represents one of many different body shells that can be used with the present invention. For example, the location and number of pillars and other structures may be different for different body shells.

Figure 3:
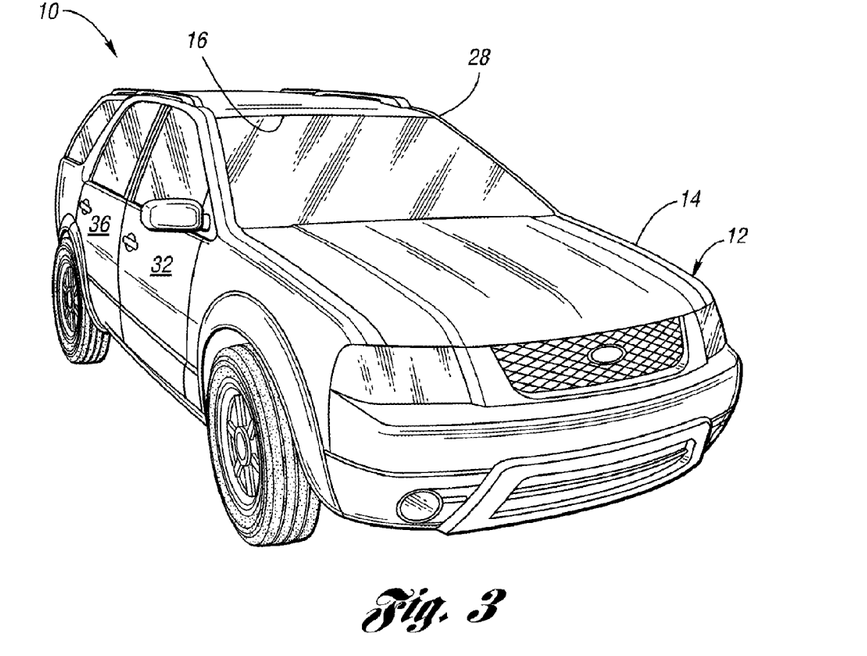
FIG. 3 is a front passenger side perspective view of the vehicle shown in FIG. 1.

FIG. 3 shows a front panel, or windshield 28, closing the body shell front opening 16. Two pairs of door panels 30, 32, 34, 36 close the body shell door openings 20, 22, 24, 26, respectively. The vehicle body 12 also includes a roof panel 37 that includes a fixed portion 38 and a movable portion 40, see FIG. 1. Attached to the roof panel movable portion 40 are a pair of transversely opposed rear pillars, or D-pillars 42, 44. The D-pillars 42, 44 extend generally downward from the roof panel movable portion 40, and engage the body shell 14.

A back panel, or back light 46, is attached to the roof panel movable portion 40 and extends between the D-pillars 42, 44. Of course, a back panel, such as the back light 46, need not be a translucent structure, but rather, may be made from an opaque material as desired. A pair of opposing retractable rear side panels, in this embodiment rear side windows 48, 50 (only one of which is visible in FIG. 1), are affixed to the body shell 14 rearward the door panels 34, 36. A tailgate 52 is affixed to the body shell 14, and is shown in a closed position FIG. 1. The tailgate 52, the rear side windows 48, 50, the roof panel movable portion 40, and the back light 46 collectively enclose the body shell rear opening 18 when the vehicle 10 is in a first body configuration, such as shown in FIG. 1.

Figure 4:
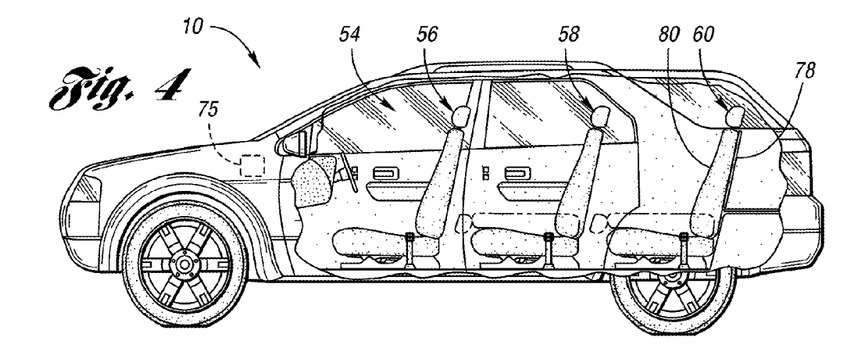
FIG. 4 is partial fragmentary side view of the vehicle shown in FIG. 1 in a first body configuration.

The first body configuration may be characterized in a number of different ways. For example, FIG. 4 shows the vehicle 10 in the first body configuration, which resembles a wagon-style vehicle. Referring also to FIGS. 1–3, it is seen that the windshield 28, the door panels 30, 32, 34, 36, the roof panel 37, the back light 46, the tailgate 52 and the rear side windows 48, 50 define a fully enclosed passenger space and cargo area, or first passenger compartment 54. It is clear from the figures that in the first body configuration, the rear side windows 48, 50 and the roof panel movable portion 40 are each in a first, or extended position.

As seen in FIG. 4, the first passenger compartment 54 includes three rows of seats 56, 58, 60. Each of the rows of seats 56, 58, 60 contains one or more vehicle seats. That is, the seats may be configured as individual bucket seats, or as a single bench seat that traverses and entire row. Of course, a vehicle, such as the vehicle 10, need not have three rows of seats in the first body configuration, but rather, may have only two rows or more than three rows of seats.

Figure 5:
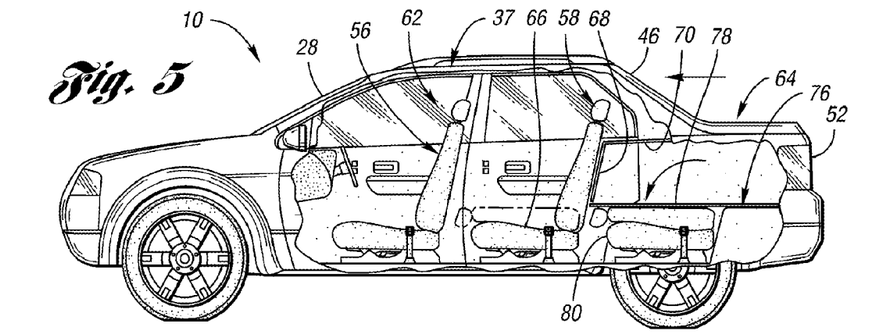
FIG. 5 is a partial fragmentary side view of the vehicle shown in FIG. 1 in a second body configuration.

FIG. 5 shows the vehicle 10 in a second body configuration. Referring also to FIGS. 1–3, it is seen that the front panel 28, the door panels 30, 32, 34, 36, the roof panel 37 and the back light 46 define a contracted enclosed passenger space, or second passenger compartment 62. As seen in FIG. 5, the vehicle 10 in the second body configuration includes the rear side windows 48, 50 and the roof panel movable portion 40 in a second, or retracted position. The second body configuration defines an open cargo area 64 behind the second passenger compartment 62.

As seen in FIG. 5, the second passenger compartment 62 is smaller than the first passenger compartment 54, and contains only two rows of seats 56, 58. The second row of seats 58 includes a first seat 66 which has attached thereto a midgate 68 and a shelf panel 70. The midgate 68 and the shelf panel 70 are configured to cooperate with the back light 46 to separate the second passenger compartment 62 from the open cargo area 64.

Figure 6:
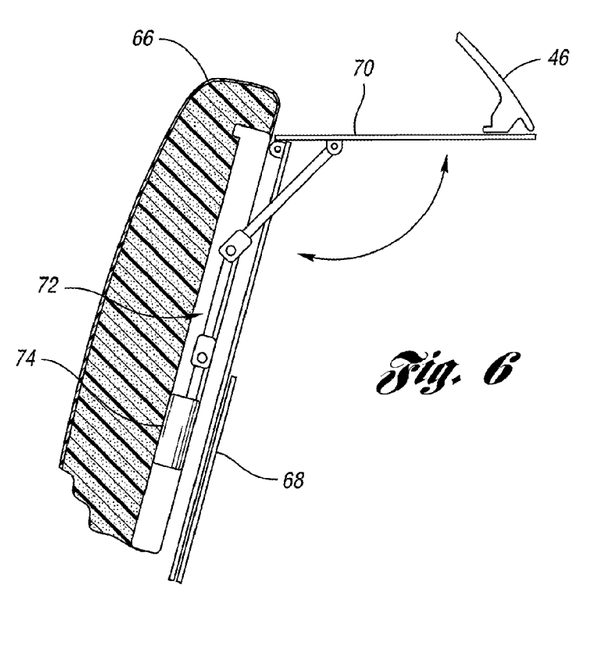
FIG. 6 is a partial fragmentary side view of a midgate and shelf panel used in the vehicle shown in FIG. 1.

FIG. 6 shows a detailed side view of the midgate 68 and the shelf panel 70. The midgate 68 and the shelf panel 70 are part of a package tray that may be attached to a single seat in the second row of seats 58. Alternatively, more than one set of midgates 68 and shelf panels 70 may be attached to each seat in the second row of seats 58. As seen in FIG. 6, the shelf panel 70 pivots from a first position adjacent the seat 66, to a second position adjacent the back light 46.

An actuator system 72 may include a motor 74 to automatically move the shelf panel 70 from the first position to the second position when the vehicle body 12 is transformed from the first body configuration to the second body configuration. In fact, the entire transformation between different body configurations can be accomplished automatically through the use of a programmable controller 75, schematically illustrated in FIG. 4. A controller, such as the controller 75, may be located in any convenient position within the vehicle 10. In fact, the controller 75 may be integrated into a vehicle system controller, or may be a separate physical device or combination of devices. The controller 75 is configured to facilitate the automatic transformation of the vehicle body 12 between body configurations. The controller 75 may be configured such that the push of a button on a key fob or a vehicle dashboard will facilitate transformation between body configurations.

The open cargo area 64 includes a load floor 76 that may be partially formed by a seat back 78 of a second seat 80. As shown in FIG. 4, the second seat 80 is in a first, or upright, position for seating a vehicle occupant. As shown in FIG. 5, the second seat 80 is in a second, or folded-down, position forming a portion of the load floor 76. It is understood that the second seat 80 may be a single bench seat or additional seats in a third row of seats 60 may similarly fold down to form a portion of the load floor 76.

Figures 7, 8:
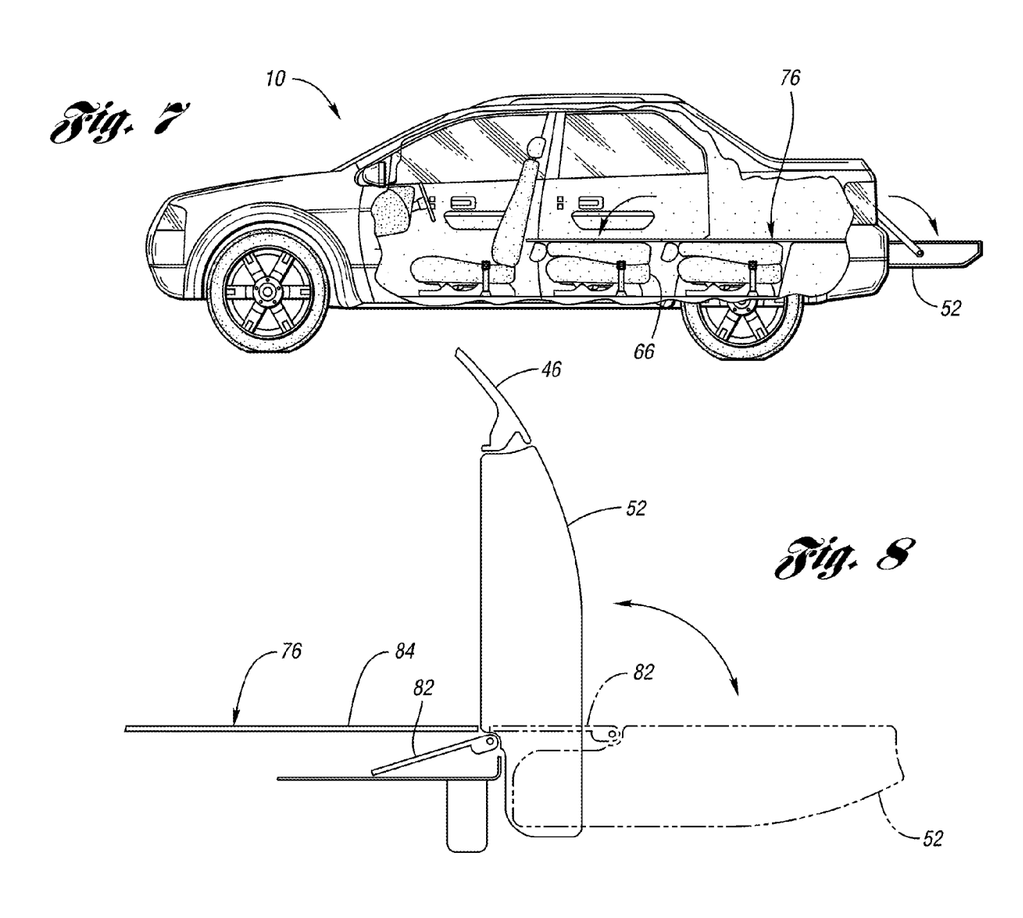
FIG. 7 is partial fragmentary side view of the vehicle shown in FIG. 1 in the second body configuration, wherein the second and third rows of seats are folded down to form an extended load floor.
FIG. 8 is a partial fragmentary side view of a tailgate and an attached floor panel.

The second body configuration, shown in FIG. 5, resembles a pickup-style vehicle with its open cargo area 64. The vehicle 10 is also capable of transforming into an extended-bed pickup-style vehicle. FIG. 7 shows the vehicle 10 having the tailgate 52 in an open position and the first seat 66 in a second, or folded-down position, such that the tailgate 52 and the first seat 66 each form a portion of the load floor 76. The vehicle 10 contains a number of features to provide a load floor 76 that is substantially level and continuous. For example, the tailgate 52 has attached thereto a floor panel 82, see FIG. 8. When the tailgate 52 is in the closed position, the floor panel 82 is disposed beneath a main portion 84 of the load floor 76. As the tailgate is pivoted into the open position, the floor panel 82 assumes a substantially horizontal position, such that it forms a portion of the load floor 76 between the tailgate 52 and the main portion 84 of the load floor 76.

Figure 9:
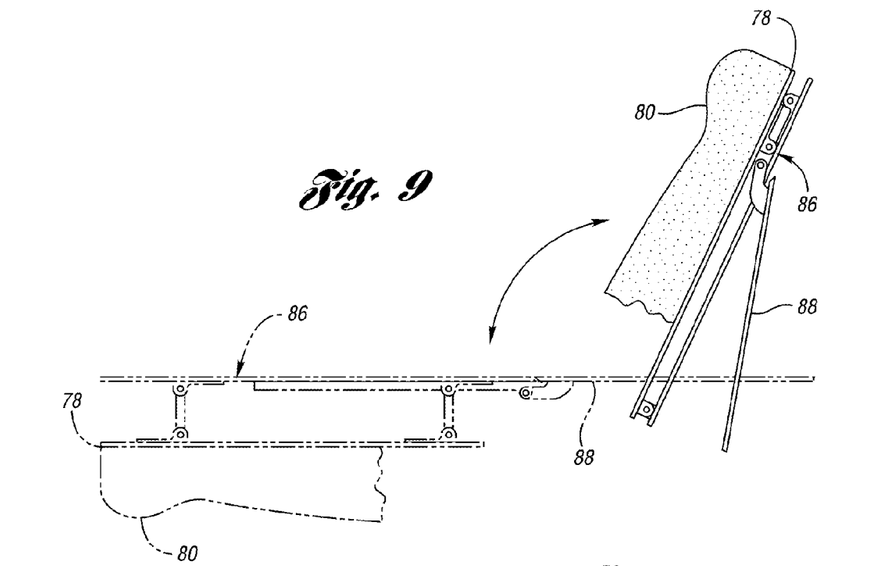
FIG. 9 is a partial fragmentary side view of a second seat and moveable load panel shown in the upright and folded down positions.

Another way in which the load floor 76 is maintained substantially level and continuous, is through the use of a movable load panel 86, shown in FIG. 9. The movable load panel 86 is attached to the seat back 78 of the second seat 80. When the second seat 80 is in a first, or upright position, the movable load panel 86 is in a retracted position, thereby facilitating space conservation within the first passenger compartment 54. When the vehicle body 12 is in the second body configuration, and the seat 80 is folded down to form a portion of the load floor 76, the seat back 78 is below the level of the main portion 84 of the load floor 76. As the seat 80 is folded down, the movable load panel 86 automatically changes position from the retracted position to an extended position.

The movement of the movable load panel 86 between the retracted and extended positions is illustrated in FIG. 9. An actuator link 88 controls the movement of the movable load panel 86 such that it retracts when the second seat 80 is moved into the upright position. The actuator link 88 also causes the movable load panel 86 to extend when the second seat 80 is folded down.

Figure 10:
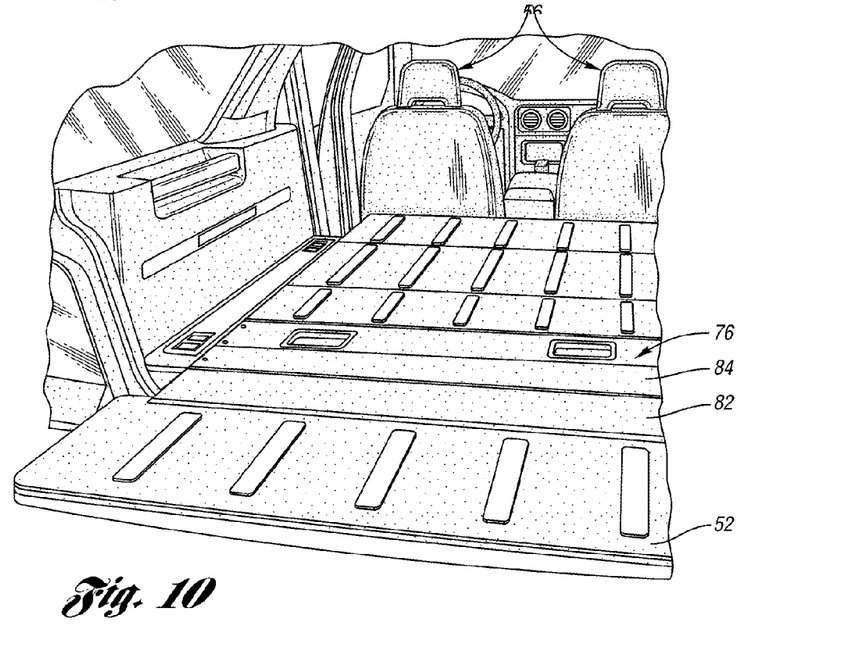
FIG. 10 is a partial fragmentary perspective view of the vehicle passenger compartment, wherein the second and third rows of seats are folded down to form an extended load floor.

Having the movable load panel 86 attached to the seat back 78 obviates the need to have a thick, bulky seat back. This is because a seat back, such as the seat back 78, does not need to be level with the load floor 76 when the seat 80 is in the folded-down position. Rather, the seat back 78 can be configured for passenger comfort while still conserving space, since the movable load panel 86 will keep the load floor 76 substantially level and continuous. Thus, with the second seat 80 in the folded-down position, and the tailgate 52 in the open position, the load floor 76 is substantially level and continuous from the outmost edge of the tailgate 52 to the first row of seats 56. This configuration is shown in FIG. 10.

To facilitate transformation of the vehicle body 12 between the first and second body configurations, movable side trim panels 90, 92 are employed, see FIG. 1. As shown in FIG. 1, when the vehicle body 12 is in the first body configuration, the side trim panels 90, 92 are in a first position which corresponds to the movable roof portion 40 being in an extended position. Because the movable roof portion 40 includes side trim panels 94, 96 which move in conjunction with the roof panel movable portion 40, it is necessary for the movable side trim panels 90, 92 to have a second position, whereby the side trim panels 94, 96 may slide over them.

Figure 11:
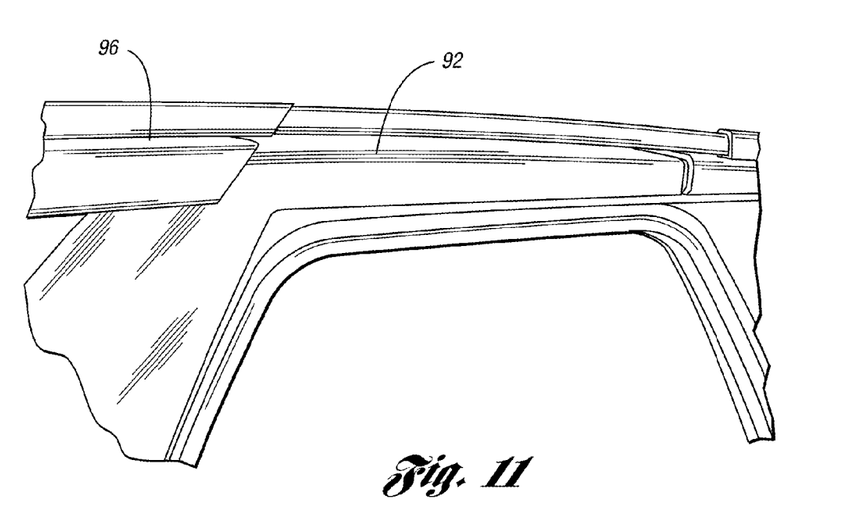
FIG. 11 is a partial fragmentary perspective view of a movable side trim panel forming a portion of the vehicle body shown in FIG. 1.

For example, the movable side trim panel 90, shown in FIG. 1 in the first position, is substantially flush with the side trim panel 94 attached to the roof panel movable portion 40. The same is true on the passenger side of the vehicle with regard to the movable side trim panel 92 and the side trim panel 96. FIG. 11 shows the movable side trim panel 92 in the second position, whereby the side trim panel 96 can slide over top of it. Thus, as the roof panel movable portion 40 changes between the extended position and the retracted position, the side trim panels 94, 96 substantially cover the movable side trim panels 90, 92 such that they blend with other trim elements on the vehicle body 12, see FIG. 16.

Figure 12:
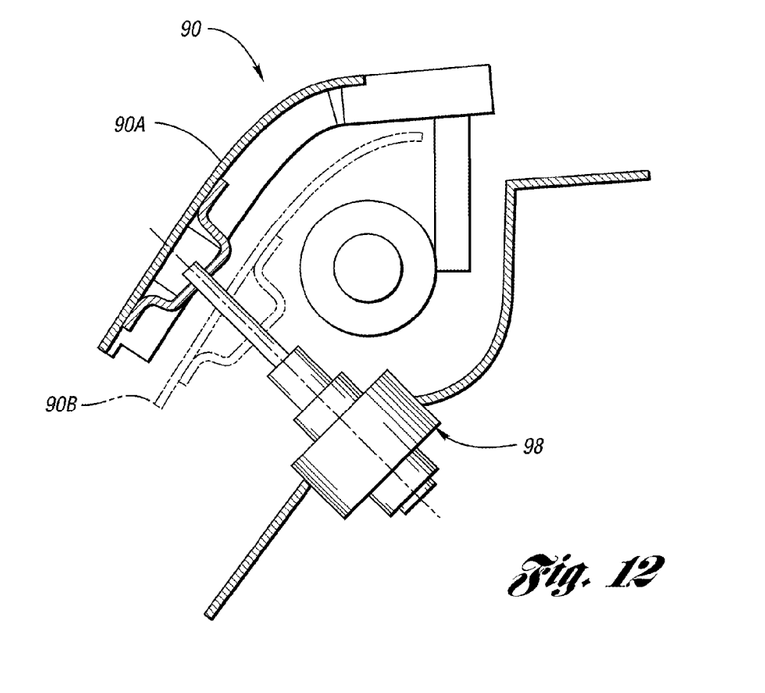
FIG. 12 is a sectional view of a movable side trim panel taken through lines 12—12 in FIG. 1.

FIG. 12 shows a cross-sectional view of the movable side trim panel 90. Initially, the movable side trim panel 90 is in a first position 90A. When the vehicle body 12 is commanded to transform from the first body configuration to the second body configuration, an actuator, such as electric motor 98, automatically moves the movable side trim panels 90, 92 from the first position to the second position. Of course, other devices-e.g., hydraulic or pneumatic pistons-can be used to move the movable side trim panels 90, 92 from the first position to the second position. Once in the second position, the roof panel movable portion 40 can move into the retracted position such that the side trim panels 94, 96 move into place over the side trim panels 90, 92.

Figure 13:
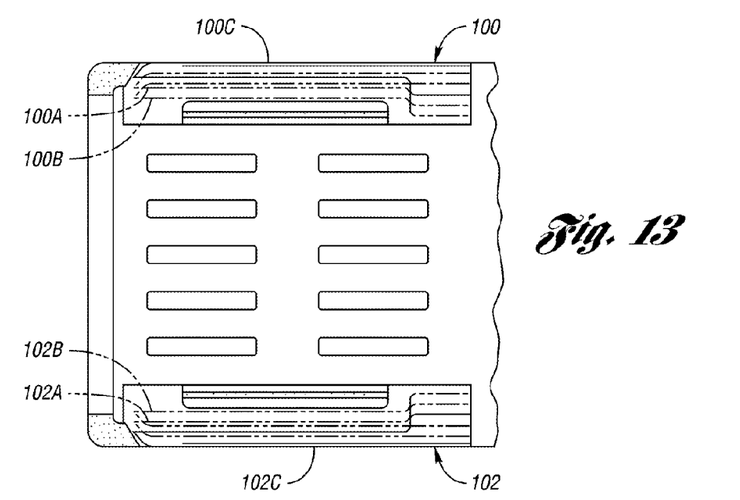
FIG. 13 is a partial fragmentary top plan view illustrating garnish panels used on the vehicle shown in FIG. 1.

To further facilitate transformation of the vehicle body 12 between the first and second body configurations, a pair of garnish panels 100, 102 are used, see FIG. 13. FIG. 13 shows the garnish panels 100, 102 in first positions 100A, 102A, second positions 100B, 102B, and third positions 100C, 102C. The garnish panels 100,102 are in the first position 100A when the vehicle body 12 is in the first body configuration. To facilitate retraction of the rear side windows 48, 50 the garnish panels 100, 102 move to the second positions 100B, 102B. After the rear side windows 48, 50 have been retracted the roof panel movable portion moves to the retracted position, see FIGS. 15–16. Once the roof panel movable portion 40 has moved into the retracted position, the garnish panels 100, 102 move into the third positions 100C, 102C. In the third positions 100C, 102C, the garnish panels 100, 102 cover the tracks into which the rear side windows 48, 50 are retracted. The garnish panels 100, 102 then blend with other outboard trim to provide an aesthetically pleasing appearance.

Figure 14:
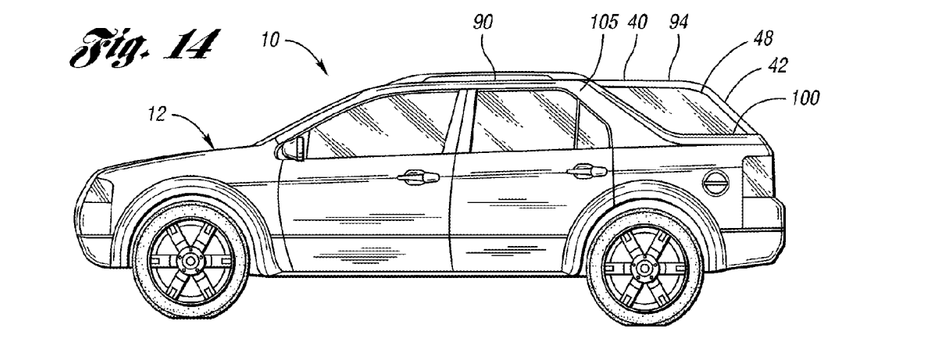
FIG. 14 is a side view of the vehicle shown in FIG. 1 in a first body configuration.
Figure 15:
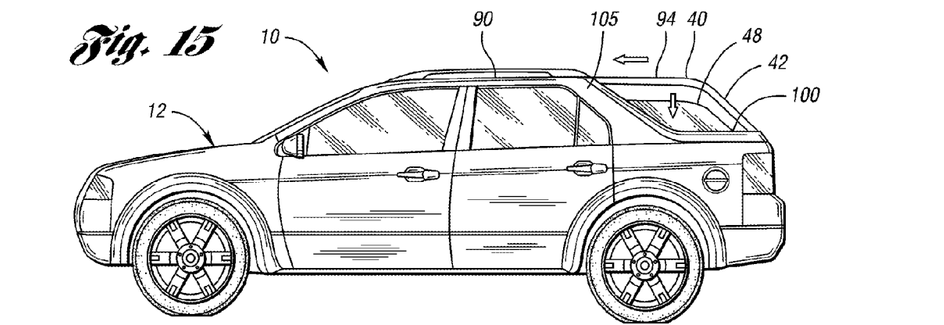
FIG. 15 is a side view of the vehicle shown in FIG. 1, wherein the vehicle is transforming from a first body configuration to a second body configuration.
Figure 16:
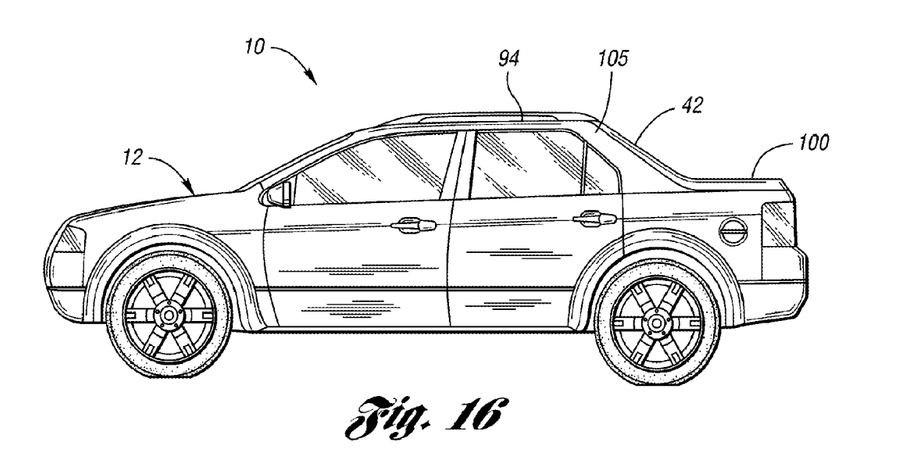
FIG. 16 is a side view of a vehicle shown in FIG. 1 in a second body configuration.

FIGS. 14–16 show the vehicle 10 as the vehicle body 12 undergoes the transformation from the first body configuration, shown in FIG. 14, to the second body configuration, shown in FIG. 16. Although only the driver side is visible in these views, it is understood that the transformation of components such as the rear side windows and garnish panels occur symmetrically on both sides of the vehicle 10. FIG. 15 shows the vehicle 10 as the body 12 starts to transform into the second body configuration. The rear side windows 48, 50 are retracted into the vehicle body 12. The third row of seats 60 is moved from the upright position to a folded-down position to form a portion of the load floor 76, see also FIGS. 4 and 5.

After the third row of seats 60 is folded down, the side trim panels 90, 92 then move inwardly to allow the side trim panels 94, 96 to cover them. The garnish panels 100, 102 move from the first position to the second position, to facilitate movement of the D-pillars 42, 44. The roof panel movable portion 40 then moves forward, thereby moving the D-pillars 42, 44 along with it. As seen in FIG. 14, when the vehicle body 12 is in the first body configuration, the D-pillar 42 is separated from a C-pillar 105 by the rear side window 48. After the roof panel movable portion 40 moves to the retracted position, the D-pillar 42 is adjacent the C-pillar 105, which provides an aesthetically pleasing appearance. Of course, the D-pillar 44 similarly moves adjacent a second C-pillar on the passenger side of the vehicle 10.

The shelf panel 70 is then moved adjacent the back light 46 to form the second passenger compartment 62, see FIGS. 4 and 5. Finally, the garnish panels 100, 102 are moved to the third position, thereby placing the vehicle body 12 in the second body configuration. Of course, these steps may take place in a different order depending on the specific configuration of a vehicle, such as the vehicle 10. Moreover, additional steps, or fewer steps, may be used to transform a vehicle body between first and second body configurations.

Figure 17:
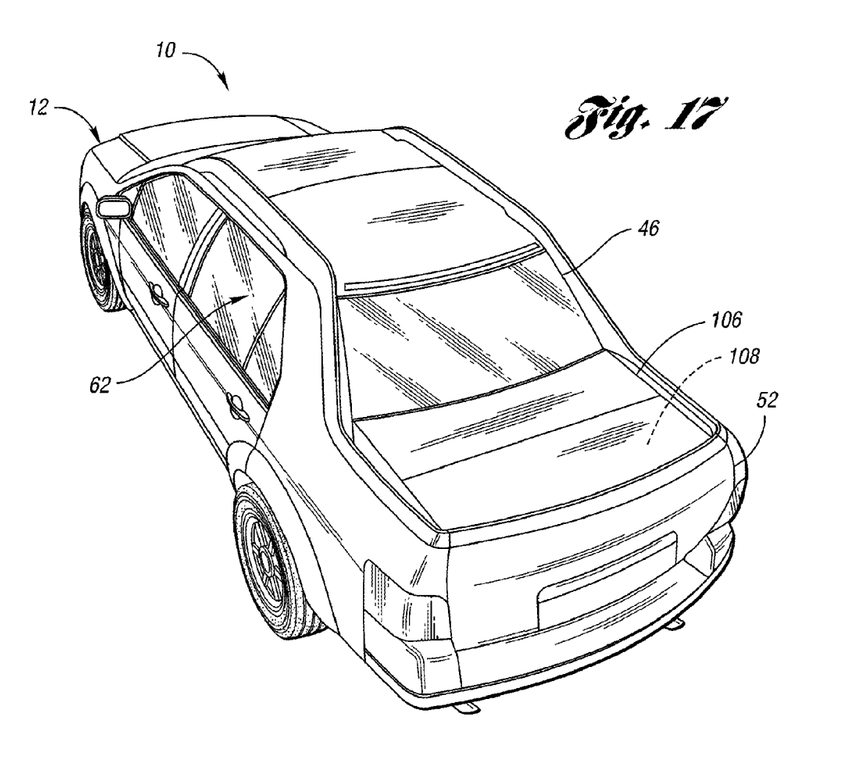
FIG. 17 is a perspective view of the vehicle shown in FIG. 1 in a third body configuration, including a trunk panel which helps to create a closed cargo area behind the passenger space.

As readily seen in FIG. 16, when the vehicle body 12 is in the second body configuration, its profile resembles that of a four door sedan. In order to complete the transformation from a wagon-style vehicle to a sedan, the transformable vehicle 10 includes a third body configuration, illustrated in FIG. 17. The third body configuration includes a trunk panel 106 that is configured to cooperate with the tailgate 52 to partially define a closed cargo area 108 behind the second passenger compartment 62. The trunk panel 106 may be a tonneau cover that is manually installed after the vehicle body 12 transforms from the first body configuration to the second body configuration. Alternatively, the trunk panel 106 may be configured to automatically move into place upon a command from a vehicle occupant. The trunk panel 106 may be attached to the tailgate 52 or even a portion of one of the vehicle seats. Thus, in the third body configuration, the vehicle 10 has assumed not only the profile of a four door sedan, but also the characteristics, including an enclosed trunk.

While the best mode for carrying out the invention has been described in detail, those familiar with the art to which this invention relates will recognize various alternative designs and embodiments for practicing the invention as defined by the following claims.

What is claimed is:

1. A flexible passenger vehicle body capable of being transformed into at least two different classes of vehicle styles, comprising:
   a body shell having front and rear openings and at least one pair of transversely opposed door openings;
   a front panel closing the body shell front opening;
   at least one pair of door panels closing the body shell door openings;
   a roof panel including a fixed portion and a movable portion, the fixed portion having at least a generally planar configuration, the movable portion having at least a generally planar configuration and having attached thereto a pair of transversely opposed rear pillars extending generally downward therefrom to engage the body shell;
   a back panel coupled to the roof panel movable portion and extending between the rear pillars;
   a pair of opposing retractable rear side panels affixed to the body shell behind the door panels; and
   a tailgate affixed to the body shell,
   the tailgate, the retractable rear side panels, the roof panel movable portion and the back panel collectively enclosing the body shell rear opening when the vehicle is in a first body configuration,
   the front panel, door panels, roof panel, back panel, tailgate and retractable rear side panels defining a fully enclosed passenger space and cargo area within the body shell in the first body configuration when the roof panel movable portion is in a first position,
   the front panel, door panels, roof panel and back panel defining a contracted enclosed passenger space in a second body configuration when the roof panel movable portion is in a second position, thereby creating an open cargo area behind the contracted enclosed passenger space.

2. The vehicle body of claim 1, further comprising a trunk panel configured to cooperate with the tailgate and the body shell in a third body configuration, thereby creating a closed cargo area behind the contracted enclosed passenger space.

3. The vehicle body of claim 1, wherein the retractable rear side panels include rear side windows, the rear side windows being retractable into the body shell.

4. The vehicle body of claim 1, further comprising a movable side trim panel disposed adjacent the roof panel, the movable side trim panel being movable between a first position and a second position, the second position facilitating transformation of the vehicle body from the first body configuration to the second body configuration.

5. The vehicle body of claim 1, further comprising a garnish panel, the garnish panel being in a first position when the vehicle body is in the first body configuration and a third position when the vehicle body is in the second body configuration, the garnish panel further being movable to a second position, thereby facilitating transformation of the vehicle body between the first body configuration and the second body configuration.

6. The vehicle body of claim 1, wherein the open cargo area includes a load floor, and wherein the tailgate in an open position forms a portion of the load floor.

* * * * *